3,425,778
PHOTOCOPY APPARATUS
Walter A. Raczynski, Wayland, and Kenneth J. White, Framingham, Mass., assignors to Dennison Manufacturing Company, Framingham, Mass., a corporation of Nevada
Filed Oct. 17, 1966, Ser. No. 587,258
U.S. Cl. 355—65        7 Claims
Int. Cl. G03b 27/70

This invention relates to apparatus for copying records, particularly electrostatic apparatus, of the type having a record window to hold the record to be copied, a copy window to hold the sheet material to be printed and means for projecting an image of the record to the copy material, such means usually comprising a mirror in addition to a lens. To obtain sharp prints it is essential that the lens, mirror and windows be maintained in accurately adjusted relationship to each other. While it is not difficult to adjust the parts in proper relationship, they are frequently thrown out of adjustment in various ways, as for example, by shocks to the frame of the apparatus in shipment and in use.

Objects of the present invention are to provide apparatus which maintains accurate adjustment, which is simple and economical to produce, which is easy to install, and which is durable and reliable in use.

According to this invention the apparatus comprises an inner housing having a record window for the record to be copied and a copy window for the sheet material, optical means including a lens for projecting, along an optical axis, an image of a record in the record window to the material in the copy window, an outer housing enclosing said inner housing, and detachable means for mounting the inner housing on the outer housing, whereby said windows and lens may be mounted in accurate relationship in the inner housing after which the inner housing may be mounted in said outer housing with said detachable means. Preferably said windows are located in two sides of the inner housing which are disposed in angular relationship to each other and said optical means includes a mirror mounted in the inner housing.

In the preferred embodiment the apparatus has a partition across the inner housing transversely of said axis to divide the housing into record and copy compartments adjacent said windows respectively, said lens being mounted in an opening in the partition and said mirror being mounted in the copy compartment, and means in the record compartment for illuminating the record window. Preferably the apparatus is further characterized by means for conveying said sheet material past said copy window, and means for mounting the conveyor means on said inner housing, and by reflectors in the record compartment for reflecting light from said illuminating means to said record window, said detachable means being disposed behind said reflectors.

Figure 1:
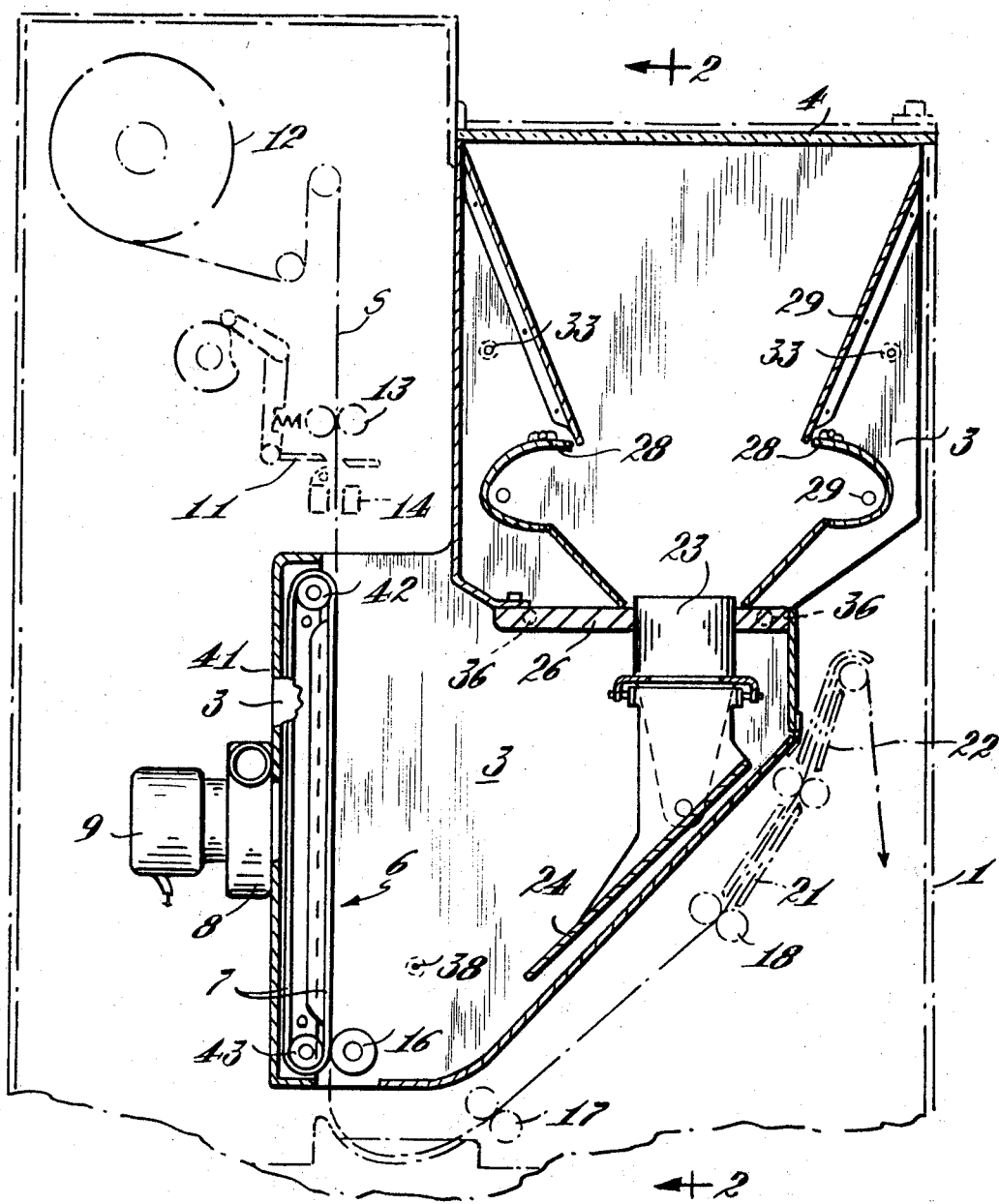
Figure 2:
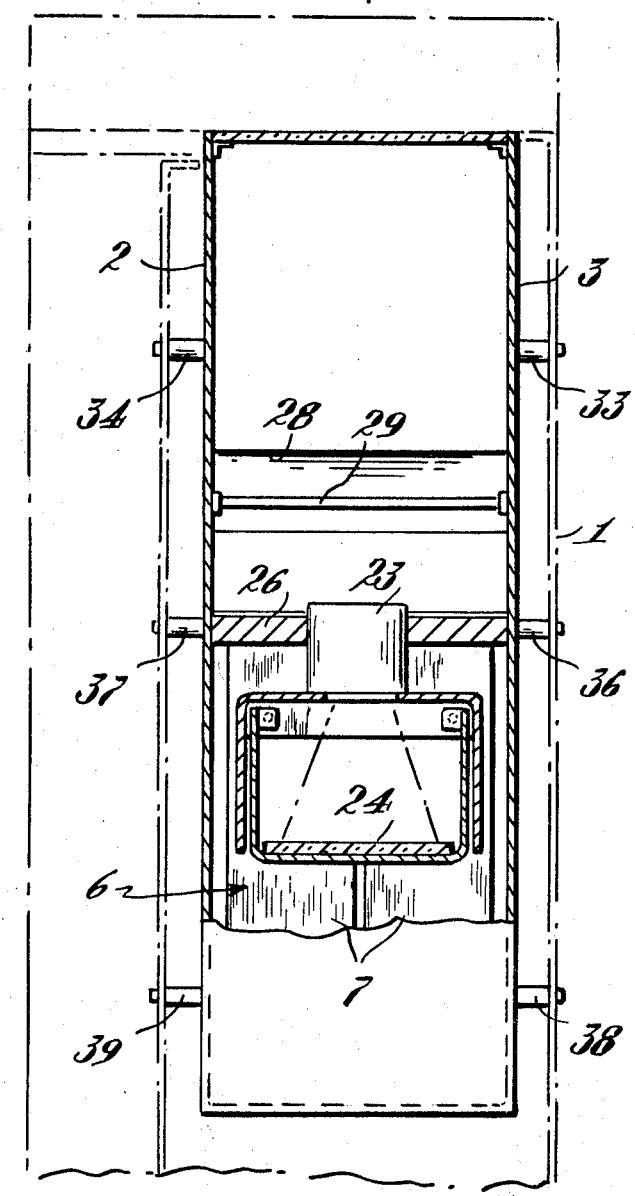

For the purpose of illustration a typical embodiment of the invention is shown in the accompanying drawings in which:

FIG. 1 is a section on line 1—1 of FIG. 2; and
FIG. 2 is a section on line 2—2 of FIG. 1.

The particular embodiment of the invention chosen for the purpose of illustration is an electrostatic copier comprising an outer housing 1 and an inner housing having two ends 2 and 3 and two sides comprising a record window 4 upon which a record may be laid and a copy window 6 through which sheets of copy material are fed by belts 7, the sheets being held against the belts by suction produced by blower 8 driven by motor 9. The sheets are cut by a cutter 11 from a strip S fed from roll 12 by rollers 13. Between the cutter and copy window is a corona device 14 for charging the sheets. Beyond the copy window are feed rollers 16, 17, 18 and 19 and driers 21 and 22. An image of a record in the record window is projected to a sheet in the copy window by means of a lens 23 and a mirror 24 mounted on a partition 26 which divides the inner housing into record and copy compartments. In the record compartment are lamps 27 and reflectors 28 and 29 for illuminating the record in the record window. The foregoing constructions are described and claimed in copending applications.

According to the present invention the inner and outer housings are spaced apart and are interconnected by bolts 33, 34, 36, 37, 38 and 39 bridging the spaces at the ends 2 and 3 of the inner housing (FIG. 2). The record window 4 is mounted in the horizontal side of the inner housing and the copy window is located in the vertical side of the inner housing (FIG. 1). Mounted on the inner housing over the copy window is a cover 41 carrying blower 8, motor 9 and the pulleys 42 and 43 over which the belts 7 are trained, the blower holding the copy sheets against the belts by suction. Thus all parts of the optical system, including the supports for the records and copy sheets, are mounted on the inner housing so that they can be accurately adjusted relatively to each other before the inner housing is mounted in the outer housing and so that shocks on the outer housing are not likely to disturb the adjustments.

It should be understood that the present disclosure is for the purpose of illustration only and that this invention includes all modifications and equivalents which fall within the scope of the appended claims.

We claim:

1. For copying records on sheet material, an inner housing comprising sides and ends, one of said sides comprising a record window for the record to be copied and another side comprising a copy window for the sheet material, optical means including a lens for projecting, along an optical axis, an image of a record in the record window to the material in the copy window, an outer housing enclosing said inner housing, and detachable means for mounting the inner housing on the outer housing, whereby said windows and lens may be mounted in accurate relationship in the inner housing after which the inner housing may be mounted in said outer housing with said detachable means.

2. Apparatus according to claim 1 wherein said windows are located in two sides of the inner housing which are disposed in angular relationship to each other and said optical means includes a mirror mounted in the inner housing.

3. Apparatus according to claim 2 wherein said two sides are in planes at right angles to each other and said ends are perpendicular to said sides.

4. Apparatus according to claim 1 wherein said detachable means connect said ends of the inner housing to the outer housing.

5. Apparatus according to claim 1 further characterized by means for conveying said sheet material past said copy window and means for mounting the conveyor means on said inner housing.

6. Apparatus according to claim 2 further characterized by a partition across the inner housing transversely of said axes to divide the housing into record and copy compartments adjacent said windows respectively, said lens being mounted in an opening in the partition and said mirror being mounted in the copy compartment, and means in the record compartment for illuminating the record window.

7. Apparatus according to claim 6 further characterized by reflectors in the record compartment for reflecting light from said illuminating means to said record window, said detachable means being disposed behind said reflectors.

References Cited

UNITED STATES PATENTS 3,272,066   9/1966   Rice _____ 88—24

NORTON ANSHER, *Primary Examiner.*

R. A. WINTERCORN, *Assistant Examiner.*

U.S. Cl. X.R.

240—41.3